(12) United States Patent
Kito

(10) Patent No.: US 7,463,332 B2
(45) Date of Patent: Dec. 9, 2008

(54) IMAGE FORMING METHOD AND APPARATUS

(75) Inventor: Eiichi Kito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 500 days.

(21) Appl. No.: 11/341,456

(22) Filed: Jan. 30, 2006

(65) Prior Publication Data

US 2006/0170887 A1 Aug. 3, 2006

(30) Foreign Application Priority Data

Jan. 28, 2005 (JP) ............................. 2005-021303
Feb. 22, 2005 (JP) ............................. 2005-045406

(51) Int. Cl.
*G03B 27/52* (2006.01)
*G03B 27/00* (2006.01)
*G03B 27/32* (2006.01)

(52) U.S. Cl. ............................. 355/40; 355/18; 355/77; 53/447

(58) Field of Classification Search .................... 355/18, 355/40, 77; 53/435, 447
See application file for complete search history.

(56) References Cited

U.S. PATENT DOCUMENTS 5,070,677 A * 12/1991 Hicks ........................... 53/435
5,936,709 A * 8/1999 Yamamoto .................... 355/40

FOREIGN PATENT DOCUMENTS

JP 2003-35938 A 2/2003

* cited by examiner

*Primary Examiner*—Alan A Mathews
(74) *Attorney, Agent, or Firm*—Sughrue Mion, PLLC

(57) ABSTRACT

An image forming apparatus of the invention packs a plurality of image prints in a bag as finished prints corresponding to an order a user made and outputting the bag containing the plurality of image prints. At first, the apparatus records each of the plurality of images on a recording medium based on image data which is reproduced corresponding to each of the plurality of images, thereby to produce the image prints on an image-by-image basis. Next, it judges whether the bag needs to be sealed or not when the plurality of image prints thus produced are packed in the bag as the finished prints corresponding to the order. Next, it packs the plurality of image prints in the bag as the finished prints corresponding to the order and seals the bag containing the plurality of image prints based on a result of the judging. Thereby it outputs the plurality of image prints contained in the sealed bag. The judgment of whether the bag needs to be sealed or not is performed by checking appropriateness of each of the plurality of image prints or the judgment is based on order information corresponding to the order.

18 Claims, 5 Drawing Sheets

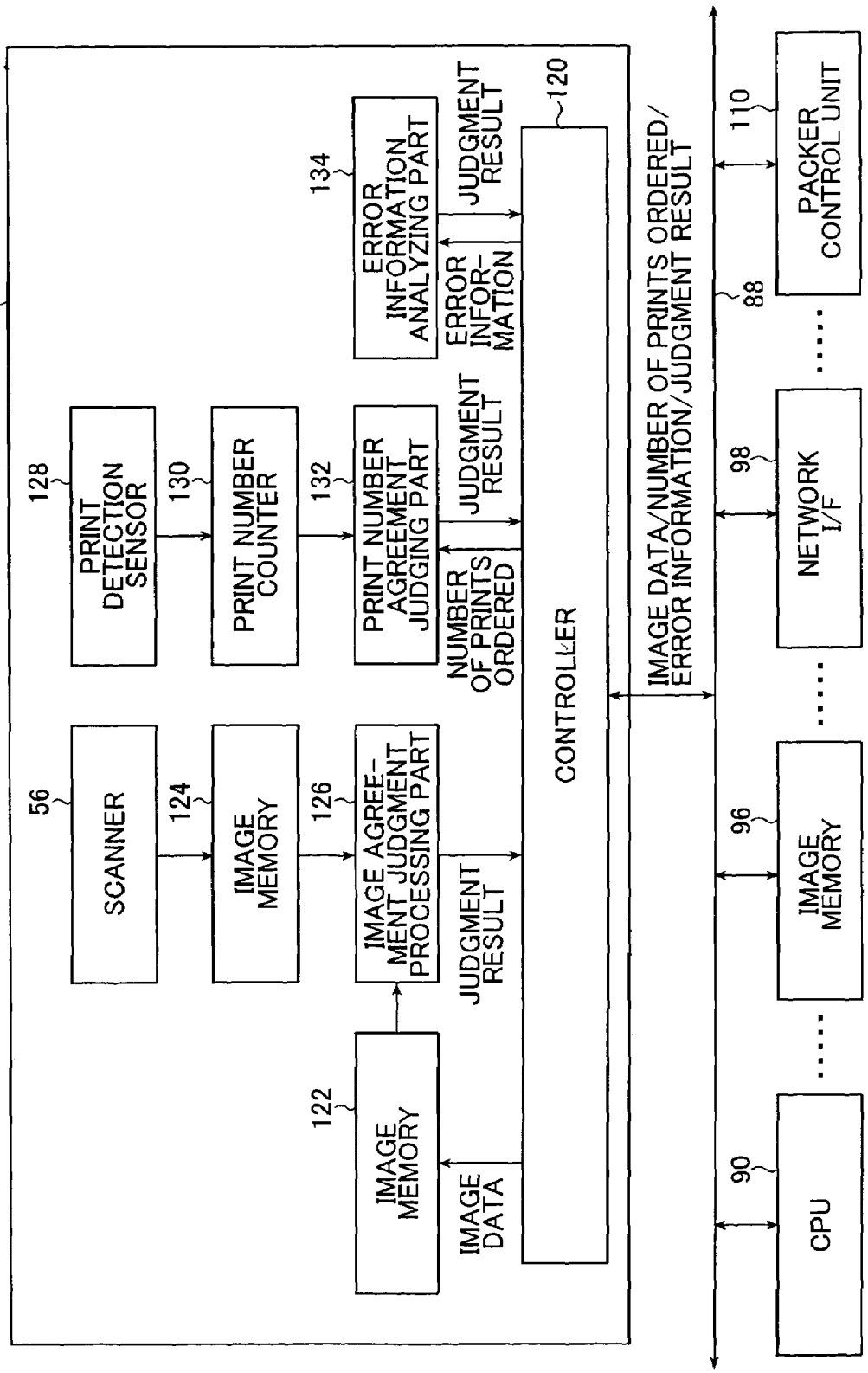

IMAGE FORMING METHOD AND APPARATUS

BACKGROUND OF THE INVENTION

The present invention relates to image formation for producing image prints (hereinafter referred to as "photographic prints" or "prints") from images photographed with a digital still camera or the like and packing the image prints, and more specifically to an image forming method and apparatus for suitably preventing inappropriate from being packed, or an image forming method and apparatus for suitably dealing with packed prints in image output in which prints are automatically packed.

Digital still cameras have come into more widespread use along with the popularization of a personal computer (PC), a personal digital assistance (PDA), or the like. A portable telephone having a photographing function has also become popular.

Images photographed by a digital still camera or a portable telephone are input to a PC, where the images are processed and then used for various applications as in a website or on a new year greeting card. However, there is a strong demand for preserving such photographed images as high-quality photographic prints. To meet such a demand, laboratories or other specialized shops have recently started to produce prints from images photographed by a digital still camera or a portable telephone.

When an order for producing prints from images photographed by a digital still camera is placed with a laboratory, for example, a print order receiver (hereinafter referred to as "receiver") installed in a store such as a laboratory, various commercial facilities or the like is used to place the order.

Generally, when a recording medium such as a memory card, an IC card or a CD-R for storing photographed images (image data) is loaded on the receiver, or a digital still camera or a portable telephone is connected to the receiver directly or by using connection means, the receiver reads the images and displays the images together with an order screen on a display.

A customer inputs order information including images to be printed, print sizes, the number of prints for each image and the like by using a touch panel display or a predetermined inputting method. When an order is established and an output instruction is issued, the images and the order information are related to each other and sent to, for example, a sever or an image processor of a laboratory, and the images are supplied therefrom to a digital photo printer, where prints are produced in accordance with the order information, and the produced prints are outputted.

Recently, so-called Internet orders have also been made in which a personal computer at one's own home functions as a receiver by installing photograph ordering software or browsing a laboratory website through a communication network such as the Internet, and images and order information are sent to a laboratory or the like through a communication device to order print production.

In a conventional case where a print is produced from a photographic film, a print production order is received in a store such as a laboratory, and a dedicated bag called "DP bag" is used for recording contact information (such as the name, address, and telephone number) and the like of a customer or a print orderer and for receiving the photographic film (film cassette or cartridge) therein. At the time of the print production, the photographic film is taken out of the DP bag to be subjected to development processing, and (finished photographic) prints are produced using the developed film. Then, the prints and the developed film are packed in the DP bag and are delivered to the customer.

In contrast to this, in print production from images photographed with a digital still camera or the like, there exists no photographic film. Therefore, mere simple work for delivery is necessary and a whole process from print production to packing of the prints can be automated.

For instance, JP 2003-35938 A discloses a digital photo printer (photograph processing machine). The photo printer includes an order information storage part for storing order information, an image data storage part for storing image data to be used for producing (photographic) prints, an image exposure part for producing the prints by exposing a photosensitive material based on the image data, an order information control unit for converting the order information into image data and controlling the image exposure part to produce an order information print by exposing the photosensitive material based on the image data, and print receiving means for storing the prints and the order information print in a print storage bag. Alternatively, the photo printer further includes a mechanism for closing the print storage bag containing the order information print and a predetermined number of prints.

As described above, in print production from images photographed with a digital still camera or the like, there is no need to deal with a film, which makes it possible to automatically perform a whole process from print production to packing of the prints, thereby greatly reducing time and labor at a laboratory or the like.

However, in print production in which outputted prints are automatically packed, it is impossible to check (inspect) the prints thus produced. Therefore, when inappropriate prints have been produced for some reason, this leads to a possibility that the defective prints be provided to a customer as they are. In order to avoid such a problematic situation, the packed prints have to be taken out of the bag for inspection, which adversely increases the time and labor at a laboratory or the like.

As regards the bag for the automatic packing, it is preferable that the bag be made in a size slightly larger enough to contain the most general print size, to which the bag is supposed to correspond, in terms of material efficiency and production cost. However, for instance, in a case where the prints come in various sizes including an L size, an H size, and in a DSC size, or in a case where the prints come in multiple sizes which is so-called a mixed printing according to one order, there is a case where it is difficult to appropriately pack prints having sizes larger than a set print size in a bag, which may lead to a trouble. Conversely, when the bag corresponds to a large print size, prints in all sizes can be contained in the bag. However, there occurs an inconvenient situation in which smaller prints rotate and move in the bag, and stacked and bundled prints are disordered in the bag.

In addition, while a printer designed for print production dealing with no film can attain automatic packing, it is difficult for the printer to deal with a print production from a film, for the film must be returned to a customer.

SUMMARY OF THE INVENTION

An object of the present invention is to solve the problems of the conventional techniques described above by providing an image forming method and apparatus with which it becomes possible to perform automatic packing of prints, prevent inappropriate prints from being provided to a customer by conducting an inspection of produced prints with reliability, and perform print remaking (reprinting) with ease when produced prints are inappropriate.

Another object of the present invention is to provide an image forming method and apparatus with which it becomes possible to perform automatic packing of prints, conduct an inspection of prints with ease as necessary, and suitably deal with both cases of mixed printing, in which prints come in multiple print sizes according to one order, and of print production from a film.

In order to attain the objects described above, the present invention provides a following image forming method and an apparatus for packing a plurality of image prints in a bag as finished prints corresponding to an order and outputting the bag containing the plurality of image prints.

The image forming method comprises: an image print producing step of recording each of the plurality of images on a recording medium based on image data which is reproduced corresponding to each of the plurality of images, thereby to produce the image prints on an image-by-image basis; a step of judging whether the bag needs to be sealed or not when the plurality of image prints thus produced are packed in the bag as the finished prints corresponding to the order; and an image print outputting step of packing the plurality of image prints in the bag as the finished prints corresponding to the order and sealing the bag containing the plurality of image prints based on a result of the judging, thereby to output the plurality of image prints contained in the sealed bag.

In the method, the judging of whether the bag needs to be sealed or not may be performed by checking appropriateness of each of the plurality of image prints; and when it is judged from a checking result that all of the plurality of image prints are appropriate, the plurality of image prints thus judged to be appropriate are packed in the bag as the finished prints corresponding to the order, the bag containing the image prints, and the sealed bag is outputted to a predetermined portion, and when it is judged from a checking result that any of the plurality of image prints are inappropriate, the plurality of image prints to be the finished prints corresponding to the order, which include inappropriate images, are outputted to a portion other than the predetermined portion without being packed in the bag.

Alternatively, in the method, the judging of whether the bag needs to be sealed or not may be performed by checking appropriateness of each of the plurality of image prints; and when it is judged from a checking result that any of the plurality of image prints are inappropriate, the plurality of image prints are packed in the bag and the bag containing the plurality of image prints is outputted without being sealed, and when it is judged from a checking result that all of the plurality of image prints are appropriate, the plurality of image prints are packed in the bag, the bag containing the plurality of image prints is sealed, and the sealed bag is outputted.

Then, the appropriateness of each of the plurality of image prints is preferably checked based on at least one of a result of comparison between original image data of images to be reproduced on the plurality of image prints and read image data of the images actually reproduced on the plurality of image prints, a result of detection of a malfunction occurring in the image recording, and a result of comparison between a number of a plurality of images to be printed and a number of the image prints actually produced.

In the invention, whether the sealing is needed or not may be judged based on order information corresponding to the order. Then the order information preferably includes at least one of information of image quality, print size, finishing speed from the order to the outputting and an image data source of the plurality of images to be printed. For example, the order information includes at least one of information showing that high-quality finishing has been ordered, information showing that urgent finishing has been ordered, information showing that ordinary finishing has been ordered, information showing that print production in multiple sizes has been ordered, and information showing that print production from a film has been ordered; and it is judged that the sealing is not needed when the order information includes at least one of the information showing that the high-quality finishing has been ordered, information showing that production of prints including at least one print that has a size other than a predetermined size has been ordered, and the information showing that the print production from a film has been ordered, and it is judged that the sealing is needed when the order information includes one of the information showing that the urgent finishing has been ordered and the information showing that the ordinary finishing has been ordered.

The apparatus of the invention provides an image forming apparatus for packing a plurality of image prints in a bag as finished prints corresponding to an order and outputting the bag containing the plurality of image prints, comprising: an image forming part for recording each of the plurality of images on a recording medium based on image data which is reproduced corresponding to each of the plurality of images, thereby to produce the image prints on an image-by-image basis; a first judging part for judging whether a bag in which the plurality of image prints thus produced are packed as the finished prints corresponding to the order needs to be sealed or not based on a result of checking appropriateness of each of the image prints; and a packer for packing in the bag the plurality of image prints produced as the finished prints corresponding to the order, sealing the bag containing the plurality of image prints based on a result of the judging, and outputting the sealed bag.

In the invention, when the first judging part judges from a checking result that any of the plurality of image prints are inappropriate, the plurality of image prints are outputted to a portion that is different from the packer without being packed in the bag.

Alternatively, when the first judging part judges from a checking result that any of the plurality of image prints are inappropriate, the plurality of image prints are packed in the bag by the packer and the bag is outputted without being sealed.

When the first judging part judges from a checking result that any of the plurality of image prints are inappropriate, the image forming part may remake each inappropriate image print by recording an image on the recording medium based on image data corresponding to the inappropriate image print.

The appropriateness of each of the plurality of image prints is checked based on, for example, at least one of a result of comparison between original image data of images to be reproduced on the plurality of image prints and read image data of the images actually reproduced on the plurality of image prints, a result of detection of a malfunction occurring at the image forming part, and a result of comparison between a number of a plurality of images to be printed and a number of the image prints actually produced.

The apparatus further may comprise a second judging part for judging whether a bag in which the plurality of image prints thus produced are packed as the finished prints corresponding to the order needs to be sealed or not based on order information corresponding to the order, wherein when the second judging part judges that the bag needs to be sealed, the packer packs the plurality of image prints in the bag, seals the bag containing the plurality of image prints, and outputs the sealed bag. Then, the order information preferably includes at least one of information of image quality, print size, finishing speed from the order to the outputting and an image data source of the plurality of images to be printed.

The order information includes, for example, at least one of information showing that high-quality finishing has been ordered, information showing that urgent finishing has been ordered, information showing that ordinary finishing has been ordered, information showing that print production in multiple sizes has been ordered, and information showing that print production from a film has been ordered; and the second judging part judges that the sealing is not needed when the order information includes at least one of the information showing that the high-quality finishing has been ordered, information showing that production of prints including at least one print that has a size other than a predetermined size has been ordered, and the information showing that the print production from a film has been ordered, and judges that the sealing is needed when the order information includes one of the information showing that the urgent finishing has been ordered and the information showing that the ordinary finishing has been ordered.

The apparatus of the invention also comprises: an image forming part for recording each of the plurality of images on a recording medium based on the image data which is reproduced corresponding to each of the plurality of images, thereby to produce the image prints on an image-by-image basis; a second judging part for judging whether a bag in which the plurality of image prints thus produced are packed as the finished prints corresponding to the order needs to be sealed or not based on order information corresponding to the order; and a packer for packing the plurality of image prints in the bag, sealing the bag containing the plurality of image prints, and outputting the sealed bag when the second judging part judges that the sealing is needed, and for packing the plurality of image prints in the bag and outputting the bag containing the plurality of image prints without sealing the bag when the second judging part judges that the sealing is not needed.

In the invention, the order information may include at least one of information of image quality, print size, finishing speed from the order to the outputting and an image data source of the plurality of images to be printed.

The order information includes, for example, at least one of information showing that high-quality finishing has been ordered, information showing that urgent finishing has been ordered, information showing that ordinary finishing has been ordered, information showing that print production in multiple sizes has been ordered, and information showing that print production from a film has been ordered; and the second judging part judges that the sealing is not needed when the order information includes at least one of the information showing that the high-quality finishing has been ordered, information showing that production of prints including at least one print that has a size other than a predetermined size has been ordered, and the information showing that the print production from a film has been ordered, and judges that the sealing is needed when the order information includes one of the information showing that the urgent finishing has been ordered and the information showing that the ordinary finishing has been ordered.

BRIEF DESCRIPTION OF THE DRAWINGS

In the accompanying drawings:

FIG. 6 is a block diagram showing a finish check control unit in the control system of the printer shown in FIG. 5.

DETAILED DESCRIPTION OF THE PREFERRED EMBODIMENTS

The image forming method and apparatus of the present invention will be described below in detail based on the preferred embodiments with reference to the accompanying drawings.

Figures 1, 2:
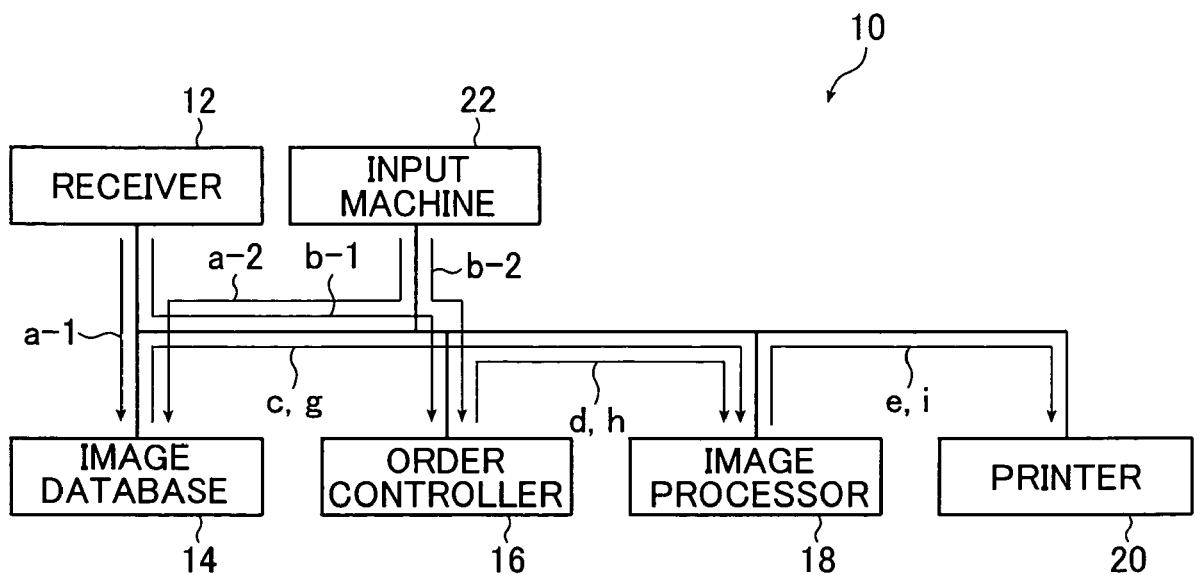
FIG. 1 is a block diagram conceptually showing a print production system that uses the image forming apparatus of the present invention.
FIG. 2 is a conceptual diagram showing an example of an order print.

FIG. 1 is a block diagram conceptually showing an embodiment of a print production system that uses the image forming apparatus of the present invention for implementing the image forming method of the present invention.

A print production system 10 (hereinafter referred to as "system 10") is a system that produces prints (finished photographic prints) mainly from image data of images photographed by a digital still camera or a portable telephone in accordance with order information provided by a customer, thereby forming a print pack to be described later. For example, the system 10 includes a print order receiver 12 (hereinafter referred to as "receiver 12"), an image database 14, an order controller 16, an image processor 18, a printer 20 and an input machine 22. The input machine 22 generates image data for producing prints from images photographed on a photographic film. These devices are connected to a known network.

In the system 10 shown in FIG. 1, the image forming apparatus of the present invention is composed of the image database 14, the order controller 16, the image processor 18, the printer 20 and the input machine 22.

The respective devices may be integrated with each other into a unit or be all separate entities. Alternatively, appropriate combinations of the respective devices are possible, as exemplified by a configuration in which the image database 14 is integrated with the order controller 16 and the image processor 18 is integrated with the printer 20, and another configuration in which the image database 14 is integrated with the order controller 16 and the image processor 18 and the printer 20 are separate entities. Further, the image database 14 may be incorporated into the image processor 18. In other words, one device may be incorporated into another device.

In addition, the number of at least one of the image database 14, the order controller 16, the image processor 18, the printer 20 and the input machine 22 included in the image forming apparatus of the present invention may be two or more.

In the system making use of the image forming apparatus of the present invention, one image forming apparatus may have more than one receiver 12 and/or more than one input machine 22. Alternatively, one receiver 12 and/or one input machine 22 may be shared by more than one image forming apparatus.

The receiver 12 is a known print order receiver which is installed in a laboratory or commercial facilities to receive an order for producing prints from image data of images photographed by a digital camera or a an imaging device in a portable telephone having a photographing function.

That is, when a storage medium is loaded at a predetermined position by a customer that is a print production orderer or when an imaging device, such as a digital still camera or a portable telephone, is connected by the customer, the receiver 12 reads image data stored in the loaded medium or the connected device, displays the read data on a display of the receiver 12, and asks the customer to input order information (order data) necessary to place a print order. On receiving the order from the customer, the receiver 12 relates images corresponding to the order and the order data to each other, supplies image data of the images, whose prints have been ordered, to the image database 14, and supplies the order data to the order controller 16. Also, when the order has been received, the receiver 12 creates and outputs a reception slip on which order contents, a reception ID, and a delivery date and time are written.

It should be noted that as examples of the order data, in addition to information indispensable to print production such as images whose prints are to be produced, print sizes, the numbers of prints to be made, and a reception number (reception ID), it is possible to cite a reception date and time, a customer ID, the name of the customer, the contact information (telephone number or the like) of the customer, and the address of the customer. Also, the receiver 12 has a function of instructing urgent finishing (urgent processing) and high-quality finishing (an order for processing in which image quality that is higher than ordinary image quality is required). When the urgent finishing or the high-quality finishing has been instructed, information as to the finishing is also contained in the order data. Note that when neither the urgent finishing nor the high-quality finishing has been instructed in the order, ordinary finishing is performed. Here, the receiver 12 is not limited to a receiver having the function of instructing both of the urgent finishing and the high-quality finishing. That is, the receiver 12 may be a receiver having a function of instructing only one kind of the finishing or may be a receiver having no function of instructing the finishing. In a like manner, the image forming apparatus according to the present invention supports both of the urgent finishing and the high-quality finishing, only one kind of the finishing, or none of the kind of the finishing.

The receiver 12 is not limited to a dedicated receiver installed in a store and may be a device that is applicable to a so-called Internet order in which a print production order is placed using a personal computer (PC) at home or the like through a computer communication network such as the Internet, an e-mail order from a portable telephone, or the like. In other words, a PC of the customer at home may function as the print order receiver in the system 10. In this case, for instance, the PC functions as the print order receiver of the present invention by accessing and browsing a laboratory website or the like. Alternatively, the PC may function as the print order receiver in the system 10 by executing dedicated ordering software downloaded thereinto. Also, a PC in a laboratory may function as the print order receiver in the system 10 by executing dedicated order receiving software installed thereonto.

The input machine 22 is a device that reads images recorded on a film, and generates and outputs digital image data. The input machine 22 includes a scanner and a processor. The scanner emits reading light toward the film, obtains projection light from the photographed images, and photoelectrically reads the projection light using an image sensor (CCD sensor). The processor performs necessary image processing on image data of the images read by the scanner, receives input of order data that is the same as the order data described above showing print sizes, the numbers of prints to be made, whether the urgent finishing has been instructed, and the like, relates the order data and the image data to each other, and outputs the order data and the image data. As the input machine 22, it is possible to use a scanner/image processor in a known digital photo print system (so-called digital mini-laboratory), for instance.

The processor of the input machine 22 performs the necessary image processing on the images read by the scanner. Then, like the receiver 12, the processor relates the order data inputted for the order into the processor and the image data to each other, supplies the image data to the image database 14, and supplies the order data to the order controller 16.

It should be noted that the image processing carried out by the input machine 22 is not specifically limited, and it is possible to use various known image processing such as log conversion, negative/positive conversion, image enlargement/reduction (electronic magnification), gradation correction, color/density correction, color saturation correction, and sharpness processing. Also, it is sufficient that each image processing described above is executed with a known method.

The image database 14 stores the image data supplied from the receiver 12 or the input machine 22, and supplies the stored image data to the image processor 18 based on an order table of the order controller 16 to be described below.

The order controller 16 creates the order table, and supplies the order data supplied from the receiver 12 or the input machine 22 to the image processor 18 based on the created order table. Note that the image database 14 does not necessarily consult the order table to supply the image data to the image processor 18, and rather the order controller 16 may issue an image data supply instruction to the image database 14 based on the order table created by the order controller 16.

The order table is a table that has been determined by the order controller 16 based on the contents of order data (such as the numbers of prints to be made and delivery dates and times) inputted for respective orders, and shows an image print processing order (print production order) for each image.

Each time order data has been inputted for an order, the order controller 16 confirms a print delivery date and time corresponding to the order, determines a new processing order, and updates the order table. Also, when remake information has been received from the printer 20 (finished-quality check control unit 112 thereof) to be described later, the order controller 16 confirms a delivery date and time corresponding to a corresponding order, determines a new processing order, and updates the order table in a like manner.

Also, the order controller 16 judges for each order whether sealing of a print pack 80 (closing of a bag for packing prints) by a packer 34 of the printer 20 to be described later is needed or not based on order data supplied for the order, adds a result of the judgment to the order data, and sends the order data with the judgment result to the image processor 18. For instance, the order controller 16 sets a flag showing whether the sealing is needed or not in the order data.

In the system 10 shown in FIG. 1, in the case of an urgent finishing order or an ordinary finishing order, the order controller 16 judges that the sealing of the print pack 80 is needed. On the other hand, in the case of a high-quality finishing order, an order for production of prints including prints each having a size other than a predetermined size, or an order for production of prints from a film (order for which image data and order data have been supplied from the input machine 22), the order controller 16 judges that the sealing of the print pack 80 is not needed. As described later, in the system 10 shown in FIG. 1, for instance, sizes that are equal to or smaller than an L print size are dealt with as the predetermined size and sizes that are larger than the L size are dealt with as the size other than the predetermined size.

It should be noted that in the system 10 shown in FIG. 1, for instance, when an order satisfies requirements for both of necessity of the sealing and unnecessity of the sealing, a higher priority is given to the unnecessity of the sealing. That is, when an order satisfies requirements for the unnecessity of the sealing, even when the urgent finishing or the like has been instructed, the print pack 80 is not sealed.

In the present invention, judgement as to whether the sealing of the print pack 80 is needed or not is not always need to be made by the order controller 16, and the judgment may be made by the image processor 18 using the order data or may be made by the printer 20 using the print sizes or the like.

The image processor 18 generates print image data by performing image processing corresponding to the order data supplied from the order controller 16 on the image data supplied from the image database 14, and supplies the print image data to the printer 20. Note that when the image data supplied from the input machine 22 is print image data, the image data may be supplied to the printer 20 by bypassing the image processor 18.

Also, instead of the receiver 12, the image processor 18 may acquire the image data from the storage medium and receive the input of the order data in the same manner as above. In this case, the image processor 18 generates the print image data by performing the image processing on the image data based on the order data, and supplies the print image data to the printer 20.

The image processing carried out by the image processor 18 is not specifically limited, and it is possible to use various known image processing such as image enlargement/reduction (electronic magnification), gradation correction, color/density correction, color saturation correction, and sharpness processing. Also, it is sufficient that each image processing described above is executed with a known method.

Also, preferably, the image processor 18 creates, for each order, order print image data for creating an order print on which various kinds of information possessed by order data corresponding to the order has been recorded, relates the order print image data to the order, and supplies the order print image data to the printer 20. It is sufficient that the image processor 18 supplies the order print image data to the printer 20 such that the order print is stacked on the top of stacked multiple prints in the print pack 80 to be described later. For instance, when the prints are discharged from the printer 20 with their back surfaces facing up, the image processor 18 supplies the order print image data to the printer 20 preceding the supply of print image data of the prints for the order, and when the prints are discharged from the printer 20 with their front surfaces facing up, the image processor 18 supplies the order print image data to the printer 20 following the supply of the print image data of the order.

Also, even when the image data supplied from the input machine 22 is supplied to the printer 20 by bypassing the image processor 18, it is preferable to generate the order print image data to be related to the order and to supply the order print image data to the printer 20. Further, after the last piece of image data (print image data or order print image data) corresponding to the order has been supplied, the image processor 18 outputs sort information indicative of the end of the order to the printer 20.

The information recorded on the order print is not specifically limited, and it is possible to record various kinds of information possessed by the order data so long as it is possible to identify the order placed by the customer with reliability.

FIG. 2 shows an example of the order print. On the order print, a reception number, a reception date and time, a customer ID, the telephone number (TEL) of the customer, the address and name of the customer, the file names of images whose prints have been produced, the numbers of the prints of the images, a print fee, and a barcode of the print fee or the like have been recorded based on the order data. The information reproduced on the order print is not limited to the information described above, and aside from the information, it is possible to record the name of a print shop, an advertisement by the print shop, an index image of the prints, a discount coupon, or the like.

Preferably, when it has been judged based on the order data that the sealing of the print pack is not needed, a reason why the sealing is not needed is recorded on the order print. Examples of the recorded reason are "high-quality finishing has been instructed", "prints in sizes other than the predetermined size are included", and "there exists a film". Accordingly, it becomes possible to perform post-processing of the unsealed print pack 80 to be described later with reliability and ease.

Also, the image processor 18 adds control information defining a control method at the printer 20 to the print image data or the order print image data. For instance, the added control information shows whether the sealing of the print pack 80 is needed or not. More specifically, for instance, the control information is a control flag showing whether the sealing is needed or not.

The printer 20 exposes printing paper made of a photosensitive material to form latent images based on the print image data and the order print image data supplied from the image processor 18, performs predetermined wet development and drying to produce finished photographic prints, and packs the prints in units of orders to obtain print packs.

The printer 20 includes an exposure part 30, a processor 32, and a packer 34. In brief, a photosensitive material A is conveyed to each part by a known conveying mechanism such as carrier roller pairs. In addition, in the printer 20, various sensors are arranged at multiple necessary positions and perform detection of a malfunction occurring at the positions to judge whether printing is performed normally or not. For instance, the sensors detect jamming of the photosensitive material A, jamming of prints P, and a trouble in which a treating liquid or a drying temperature has exceeded an allowable range to make a condition inappropriate.

The exposure part 30 of the printer 20 has a construction in which two magazines 40 each accommodating a photosensitive material roll 38 obtained by rolling up the photosensitive material A have been loaded.

The photosensitive material A is pulled out of the magazines 40 to be cut into a print size by a cutter 42, and is supplied to a predetermined exposing position after recording of a back print by a back printer 44.

The image data (print image data and order print image data) supplied from the image processor 18 is supplied from an exposure control unit 106 to be described later to an exposing unit 46 to be described below.

The exposing unit 46 brings an optical beam L (recording light) modulated based on the image data into incident at the exposing position by deflecting the optical beam L in a main scanning direction. On the other hand, the photosensitive material A is conveyed for scanning in an auxiliary scanning direction orthogonal to the main scanning direction to pass through the exposing position. Accordingly, the photosensitive material A is two-dimensionally scan-exposed by the optical beam L modulated based on the images, and latent images are recorded on the photosensitive material A. The photosensitive material A, on which the latent images have been recorded, is sequentially supplied to the processor 32.

The processor 32 includes a developing part 48 and a drying part 50.

The photosensitive material A, which has the latent images formed thereon at the exposure part 30 and has been supplied to the processor 32, is first conveyed to a processing vessel of the developing part 48, in which the photosensitive material A is subjected to development processing, bleaching/fixing processing, and water washing processing in succession. Next, the photosensitive material A is dried by a heater at the drying part 50, passes through a conveying part 52, and is discharged to an accumulating unit 68 of the packer 34 as finished photographic prints P.

It should be noted that large-sized prints, which are not automatically packed, are discharged from the drying part 50 to a large size print discharging part 54 located above without being conveyed through the conveying part 52. It is sufficient that conveying path switching is performed with a known method such as a method using a switching guide. In the printer 20 shown in FIG. 3, the packer 34 forms a print pack 80 (using packing sheet S) into a size corresponding to the L size. Therefore, the prints P with sizes that are lager than the L size or the like may not fit in the packing sheet S at the packer 34, or the prints P may be in an unstable state in the pack. To avoid this problem, in the printer 20, prints having sizes that are equal to or smaller than the L size (prints whose short sides and long sides are both equal to or smaller than those of the L size) are judged as having the predetermined size and are conveyed to the packer 34. On the other hand, the prints having sizes larger than the L size cannot fit or fit unstably in the packing sheet S, so the prints are judged as having the size other than the predetermined size. The prints having the size other than the predetermined size are discharged from the drying part 50 to the large size print discharging part 54 located above without being conveyed through the conveying part 52.

A scanner 56 constituting a finished-quality check control unit 112 to be described later is arranged between the drying part 50 and the conveying part 52. The scanner 56 generates image data by reading images on produced prints. The scanner 56 will be described later.

The packer 34 is a part that accumulates and packs prints in units of orders based on order data, and includes a sheet supply unit 60 for supplying the packing sheet S, an opening operation part 62, a stopper 64, a sealing/cutting unit 66, an accumulating unit 68, and a product receiving unit 70.

Figure 4:
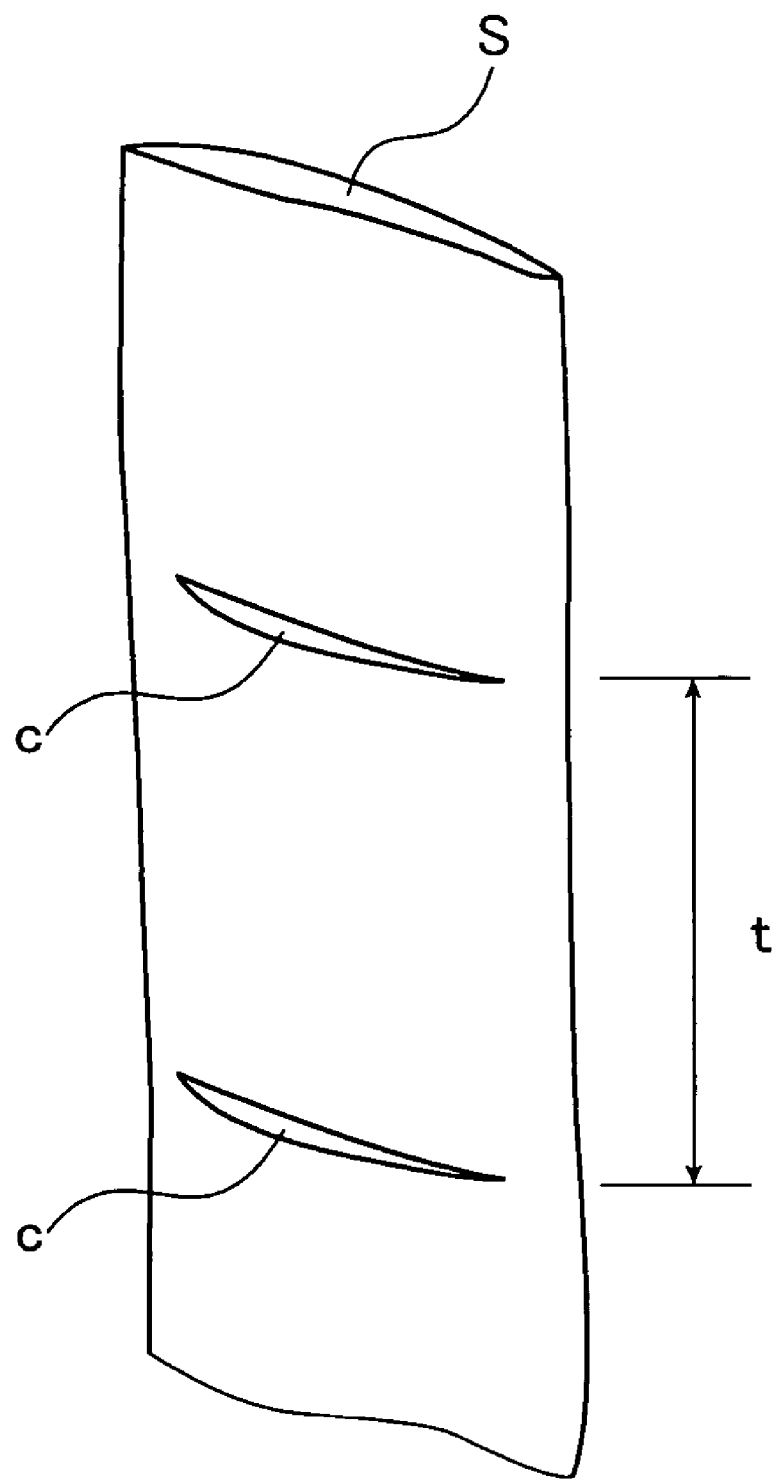
FIG. 4 is a schematic perspective diagram showing an example of a package sheet.

As shown in FIG. 4, the packing sheet S is a tubular transparent long sheet obtained by placing two sheets on each other, bonding their right and left end portions together. Also, the packing sheet S has slits c formed in one of the two sheets. The slits c extend in a direction orthogonal to a lengthwise direction and are provided at intervals t. The intervals t correspond to the length of each print pack.

It should be noted that in this embodiment, the print pack 80 corresponds to the L print size as described above. Under this condition, the prints P are packed in the packing sheet S through the slit c such that their lengthwise direction coincides with the lengthwise direction of the packing sheet S to obtain the print pack 80. Accordingly, the width of the packing sheet S and the intervals t between the slits c are set so as not to cause any inconveniences that accompany the situations where a stack of the prints P having the L size is unstably packed in the packing sheet S to be unnecessarily disordered.

The packing sheet S, which is rolled up in a roll shape with its surface having the slits c being directed toward the accumulating unit 68, is loaded into the sheet supply unit 60 as a sheet roll 72 to be conveyed through a predetermined path by a guide roll 74 and a carrier roller pair 76.

Also, the opening operation part 62 holds a portion of the packing sheet S just below the slit c by suction or the like so as to create a inner space in the packing sheet S by pulling the held portion in a direction of arrow a in the drawing, thereby opening the packing sheet S at the slit c. Preferably, wind is further blown to the slit c from above by a fan, thereby inflating the packing sheet S.

A lower portion of the packing sheet S is guided by the carrier roller pair 76 under a state in which a lower end portion thereof has been sealed in a manner to be described later, and the packing sheet S is on standby under a state in which the sheet S is suspended from the guide roll 74 while being opened at the slit c by the opening operation part 62.

On the other hand, multiple prints P conveyed through the conveying part 52 are supplied to the accumulating unit 68. The accumulating unit 68 has a downwardly inclined slope, whose lower end is directed toward an opening portion of the packing sheet S opened at the slit c by the opening operation part 62, and the stopper 64 at the lower end portion of the accumulating unit 68 is usually closed. Accordingly, the prints P supplied from the conveying part 52 are temporarily accumulated in the accumulating unit 68.

When it has been found that all prints P (including an order print) corresponding to an order have been accumulated in the accumulating unit 68 based on, for instance, the sort information, a result of counting of the number of prints, detection of discharge of the order print to the accumulating unit 68, the packer 34 opens the stopper 64. Then, the packer 34 closes the stopper 64 before the next print P is discharged to the accumulating unit 68.

As a result, the prints P in the accumulating unit 68 are dropped and packed in the packing sheet S through the opening formed at the slit c by the opening operation part 62.

After the prints P have been packed in the packing sheet S, the opening operation part 62 releases the holding of the packing sheet S. When doing so, the opening operation part 62 further stops a fan as necessary. Next, the sheet roll 72 is rotated to feed the packing sheet S to a position at which the slit c reaches the sealing/cutting unit 66.

The sealing/cutting unit 66 is a unit for fusing and cutting the packing sheet S through heating or the like in response to an instruction, and includes a heater that has a minute convex portion extending in a widthwise direction in a center portion in a direction in which the packing sheet S is conveyed.

The feeding of the packing sheet S is stopped when the slit c has reached a center position (in the direction in which the packing sheet S is conveyed) of the heater. Next, the heater of the sealing/cutting unit 66 is pressed against the packing sheet S to fuse the packing sheet S in an upper portion and a lower portion of the slit C to thereby close the opening at the slit c. Then, the packing sheet S is cut along the slit c at the center portion of the heater.

As a result, the packing sheet S containing the prints P for one order is closed at the upper end thereof and cut to obtain the print pack 80. In addition, the packing sheet S that will next contain prints P is closed at the lower end thereof (lower end of the packing sheet S that continues from the sheet roll 72).

Here, the heater of the sealing/cutting unit 66 is constructed such that heating in the center portion, heating in an upper portion, and heating in a lower portion are controllable independently of one another.

The packer 34 performs the sealing and cutting described above on each print pack that has been judged by the order controller 16 to need the sealing, that is, each print pack for which control information showing that the sealing is needed has been received from the image processor 18. Conversely, for each print pack that has been judged by the order controller 16 to need the sealing, that is, each print pack for which control information showing that the sealing is not needed has been received from the image processor 18, the packer 34 does not perform the heating in the lower portion of the heater, that is, performs only the fusing of the lower end of the packing sheet S and the cutting and discharges the print pack 80 containing the prints P without sealing the pack 80, that is, under a state in which the opening at the slit c has not been closed.

The judgment as to whether the sealing is needed or not is made in such a manner that the sealing is judged to be necessary when the order information includes the urgent finishing or the ordinary finishing order and a result of a check by the finished-quality check control unit 112 to be described later is not abnormal, and the sealing is judged to be is unnecessary otherwise.

The print pack 80 containing the prints P is conveyed by the carrier roller pairs 76 and 78 to be received by the product receiving unit 70.

Here, the product receiving unit 70 is divided into a sealed print pack receiving unit 70a and a unsealed print pack receiving unit 70b. Arranged below the carrier roller pair 78 is a distributing guide 82 that moves around an axis 82a. In the illustrated example, the print pack 80 sealed based on the control information (showing whether the sealing is needed or not) from the image processor 18 is received by the sealed print pack receiving unit 70a by setting the distribution part 82 at a position indicated with a solid line. On the other hand, when the print pack 80 is not sealed, it is received by the unsealed print pack receiving unit 70b by setting the distributing guide 82 at a position indicated with a dotted line.

Figure 5:
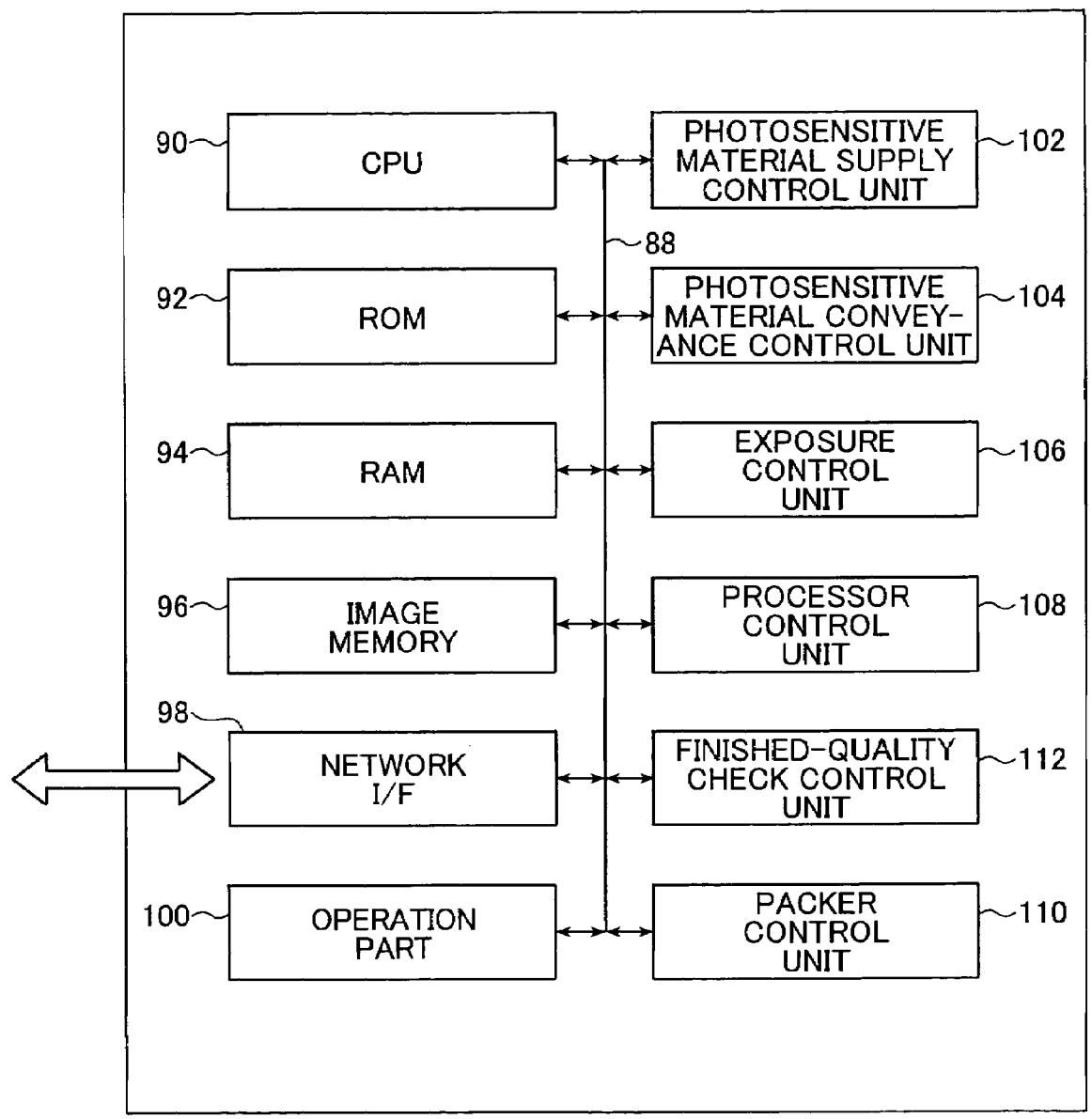
FIG. 5 is a block diagram showing a control system of the printer shown in FIG. 3.

Whether the sealing of the print pack 80 is needed or not is judged by a control system of the printer 20 to be described below. FIG. 5 is a conceptual diagram of the control system of the printer 20.

The control system of the printer 20 includes, for instance, a CPU 90, a ROM 92, a RAM 94, an image memory 96 in which images are temporarily stored, an interface (I/F) 98 with a network for connecting with the order controller 16 and the image processor 18, an operation part 100 that allows an operator to operate the printer 20, a photosensitive material supply control unit 102, a photosensitive material conveyance control unit 104, an exposure control unit 106, a processor control unit 108, a packer control unit 110, and a finished-quality check control unit 112.

The photosensitive material supply control unit 102 controls the feeding of the photosensitive material A from the magazines 40, the cutting of the photosensitive material A by the cutter 42, and the like, at the exposure part 30.

The photosensitive material conveyance control unit 104 controls the conveyance of the photosensitive material A in a cut sheet shape at the exposure part 30.

The exposure control unit 106 controls an operation of the exposing unit 46 and the scan-conveyance of the photosensitive material A.

The processor control unit 108 controls operations of the processor 32 and the conveying part 52.

The packer control unit 110 controls an operation of the packer 34.

The finished-quality check control unit 112 judges whether prints are appropriate (hereinafter referred to as "OK" for convenience) or not (similarly referred to as "NG") in units of orders by checking the finished quality of the prints based on a result of detection of whether the prints are defective or not, a result of detection of whether a trouble has occurred in the printer 20 or not, and a result of a check of the number of the prints. Then, the finished-quality check control unit 112 outputs a result of the judgment to a predetermined part such as the packer control unit 110.

FIG. 6 is a block diagram showing an example of a construction of the finished-quality check control unit 112.

The finished-quality check control unit 112 includes a controller 120, a scanner 56, image memories 122 and 124, an image agreement judgment processing part 126, a print detection sensor 128, a print number counter 130, a print number agreement judging part 132, and an error information analyzing part 134, for instance.

The controller 120 controls an operation of the finished-quality check control unit 112, and further controls supply/acquisition of information at each part to be described below.

Also, using a judgment result from each part, the controller 120 judges whether prints are OK or NG for a corresponding order, sends a result of the judgment to the packer control unit 110, and sends information about prints whose remaking (so-called reprinting) is required to a necessary part of the order controller 16.

The image memory 122 is a memory for acquiring original image data of images that should be printed from the image memory 96 of the printer 20 and storing the acquired data.

Figure 3:
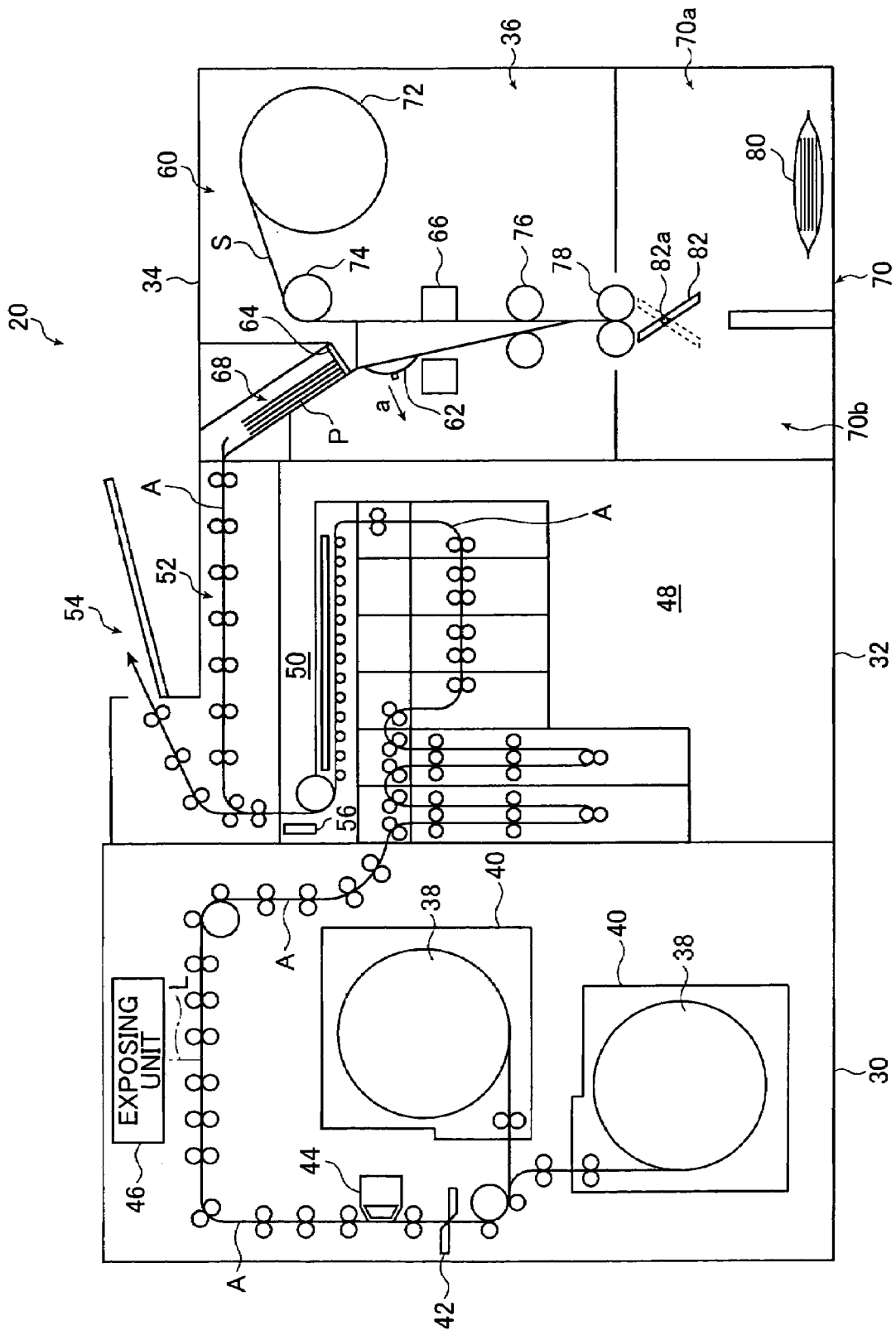
FIG. 3 is a conceptual diagram showing a printer in the image forming apparatus shown in FIG. 1.

The scanner 56 is arranged in a portion at which the conveying path rises from the drying part 50 of the printer 20 as shown in FIG. 3, and reads images on prints P after drying. It is sufficient that a known color image reading device (color scanner) that uses a CCD sensor or the like is used as the scanner 56.

The image memory 124 stores image data of the images read by the scanner 56, that is, read image data of the images formed on the prints P.

The image agreement judgment processing part 126 reads both the original image data of the images that should be printed from the image memory 122 and the read image data of the images on the prints read by the scanner 56 from the image memory 124, and judges whether the prints are appropriate or not by comparing the original image data against the read image data.

It should be noted that a judgement as to whether the prints are appropriate or not can be made based on, for instance, a result of an image agreement degree-based judgment determined by using similarity in a density histogram, a degree of approximation in image characteristic amounts such as an average density, the maximum density, and the minimum density, each between the read image data and the original image data, or on white edge accuracy (in the case of printing with edges, whether widths of the edges or the like are appropriate or not, and in the case of printing without edges, whether unnecessary white portions exist in peripheral portions of the print or not).

Then, the image agreement judgment processing part 126 sends a result of the judgment as to whether the prints are appropriate or not to the controller 120. The controller 120 judges that the prints are NG when the judgment result shows that any of the prints for one order are inappropriate and judges that the prints are OK otherwise. Then, the controller 120 sends a result of the judgment to a predetermined part.

The print detection sensor 128 is one of print detection sensors arranged in respective portions in the printer 20 and is, for instance, a sensor arranged at an exit of the conveying part 52.

The print number counter 130 counts the number of prints in units of orders based on a result of the detection by the print detection sensor 128, the sort information, and the like, and sends the number of the print thus counted to the print number agreement judging part 132.

The print number agreement judging part 132 compares the number of prints that have actually produced against the number of prints to be produced supplied from the order controller 16 in units of orders, thereby judging whether the number of the produced prints and the number of the ordered prints agree with each other, that is, whether the number of the prints for one order is appropriate or not. Then, the print number agreement judging part 132 sends a result of the judgment to the controller 120. According to the result of the judgement, the controller 120 sends an OK or an NG as a judgment result to a predetermined part.

The error information analyzing part 134 analyzes error information detected at and sent from each part in the printer 20, to determine a part in the printer 20 at which the photosensitive material A (or prints P) can be outputted as appropriate prints, for instance, and sends a result of the judgment to the controller 120.

The controller 120 judges whether prints can be outputted appropriately or not using the judgment result for one order or the like and outputs an OK or NG as a judgment result to a predetermined part.

It should be noted that in the example shown in FIG. 6, preferably, a judgement as to whether outputted prints are NG or OK for one order is made based on three results each obtained by checking appropriateness of images formed on the prints, by checking the number of the prints for one order, and by detecting error information. However, the present invention is not limited to this. For instance, the judgment may be made only based on whether the images are appropriate or not. Alternatively, the judgment as to whether the prints for one order are OK or NG may be made only based on one or two of the three results described above. Note that the result obtained by checking the images is a result obtained by judging whether the images are appropriate or not by comparing the read image data obtained by reading the images on the produced prints with the scanner 56 against the original image data of the images to be printed.

Next, the present invention will be described in more detail by explaining an operation of the system 10 while referring to the block diagram in FIG. 1.

As described above, when a print order has been placed by a customer at the receiver 12 and established, the receiver 12 relates image with order data each corresponding to the established order, supplies the image data to the image database 14 (arrow a-1 of FIG. 1), and supplies the order data to the order controller 16 (arrow b-1). Alternatively, when the scanner of the input machine 22 has read images on a film and order data has been inputted into the processor of the input machine 22, the processor performs predetermined image processing on the images, relates the image data with the order data for each order, supplies the image data to the image database 14 (arrow a-2), and supplies the order data to the order controller 16 (arrow b-2).

Each time having received order data for one order, the order controller 16 determines a new processing order with consideration given to a delivery date and time corresponding to the order and updates the order table. Also, the order controller 16 judges whether the sealing of the print pack 80 is needed or not based on the contents of the order data and adds a result of the judgment to the order data. As described above, the order controller 16 judges that the sealing is needed when the order includes an urgent finishing order or an ordinary finishing order, and judges that the sealing is not needed when the order includes a high-quality finishing order, an order for production of prints including prints in sizes other than the predetermined size, or an order for production of prints from a film (order in which image data is received from the input machine 22 and print production is requested). Also, as regards a case where the sealing is judged to be necessary, if the outputted prints are inappropriate due to inappropriateness of the images or the like, the order controller 16 judges that the sealing is not needed regardless of the order that includes an urgent finishing order which requires the sealing.

The image database 14 consults the order table of the order controller 16 and sequentially supplies the image data to the image processor 18 based on the contents of the order table (arrow c). In a like manner, the order controller 16 consults the order table to sequentially supply the order data to the image processor 18 based on the contents of the order table (arrow d).

The image processor 18 creates print image data by processing the supplied image data based on the supplied order data, supplies the print image data to the printer 20, creates order print image data for each order using the order data, and supplies the order print image data to the printer 20 at the end of (at the outset of) supplying its corresponding print image data (arrow e). In addition, the image processor 18 supplies the sort information to the printer 20 for each order to follow the last piece of image data corresponding to the order.

The printer 20 records latent images by exposing the photosensitive material A based on the supplied print image data and order print image data at the exposure part 30, performs predetermined development processing and drying at the processor 32, and outputs the photosensitive material A as prints P.

The prints P for one order are sent to the packer 34 or the large size print discharging part 54 based on the properties of the prints P. The print order information includes at least one of the orders for high-quality finishing, urgent finishing, ordinary finishing, print production in multiple sizes, and production of prints from a film. In the case of the high-quality finishing order, an order for production of prints including prints in sizes other than the predetermined size, or the order for production of prints from a film, the produced prints P are sent to the large size print discharging part 54 without being sent to the packer 34. On the other hand, in the case of the urgent finishing order or the ordinary finishing order, the produced prints P are sent to the packer 34.

When the prints P have been sent to the packer 34, as described above, they are packed in the packing sheet S in units of orders based on the sort information and the print pack 80 is discharged to the product receiving unit 70.

Here, when it is judged that the sealing of the print pack 80 is needed based on the control information added to the image data, at the packer 34, as described above, the sealing/cutting unit 66 seals the print pack 80 containing the prints P, cuts the packing sheet S, and seals the lower end of the packing sheet S to obtain the next print pack. In this case, the distribution part 82 of the product receiving unit 70 is set at the position indicated with the solid line and the print pack 80 is discharged to the sealed print pack receiving unit 70a.

On the other hand, when it is judged that the sealing is not needed when the control information added to the print image data or the order print image data, as described above, the sealing/cutting unit 66 performs only the cutting of the packing sheet S and the sealing of the lower end of the packing sheet S to obtain the next print pack and does not perform the sealing of the upper end of the print pack 80 containing the prints P. In this case, the distributing guide 82 of the product receiving unit 70 is set at the position indicated with the dotted line and the unsealed print pack 80 is discharged to the unsealed print pack receiving unit 70b without being sealed.

As described above, the judgment as to whether the sealing of the print pack 80 is needed or not is made so that when the order information includes the order of the urgent finishing or the ordinary finishing and the finished-quality check control unit 112 of the printer 20 has judged that the outputted prints are appropriate, it is judged that the sealing is needed.

That is, when the finished-quality check control unit 112 of the printer 20 has detected no abnormality and judged that the prints are OK and the order information includes the order for the urgent finishing or the ordinary finishing, the distributing guide 82 of the product receiving unit 70 is set at the position indicated with the solid line and the print pack 80 is discharged to the sealed print pack receiving unit 70a.

In contrast to this, when the finished-quality check control unit 112 has detected an abnormality, that is, has judged that the prints are NG due to detection of inappropriate prints, inappropriateness of the number of the prints, or analysis of an error such as jamming, the finished-quality check control unit 112 judges that the sealing is not needed and sends information showing that the prints have been judged as NG to the packer 34. Also, the finished-quality check control unit 112 sends information (NG information) showing images, which need to be remade due to the occurrence of the NG, to the order controller 16 (arrow f).

When the prints in the print pack have been judged as NG, the packer 34 does not close the lower portion of the slit c of the packing sheet S (does not heat the lower portion of the heater) at the sealing/cutting unit 66 and discharges the unsealed print pack to the product receiving unit 70.

In the case of the NG, the distribution part 82 of the product receiving unit 70 is set at the position indicated with the dotted line and the print pack 80 is discharged to the unsealed print pack receiving unit 70b.

The sealed print pack 80 discharged to the sealed print pack receiving unit 70a is taken out and put on a predetermined shelf by an operator.

On the other hand, on the unsealed print pack 80 discharged to the unsealed print pack receiving unit 70b, the operator performs processing corresponding to a reason why the print pack 80 has not been sealed. That is, in the case of a high-quality finishing order, the operator conducts an inspection. Also, in the case of an order for production of prints including prints that each have a size, such as a panorama size or a king size, which is not the predetermined size, the operator takes the prints in the sizes other than the predetermined size out of the large size print discharging part 54 and packs them in the print pack 80. Further, in the case of an order for production of prints from a film, the operator performs necessary processing (such as cutting of one long film composed of multiple frames) on the film and packs the film in the print pack 80 after the processing. As described above, on the order print in the unsealed print pack 80, a reason why the print pack 80 has not been sealed is recorded, so it becomes possible for the operator to perform post-processing of the unsealed print pack with ease and reliability.

The order controller 16 updates the order table based on the order data and the NG information. For instance, when the prints are NG and the delivery date and time of the print pack containing the NG prints is approaching, the order controller 16 updates the order table so that remaking of inappropriate prints is performed soon. On the other hand, when the delivery date and time is not approaching, the order controller 16 updates the order table so that the print remaking is performed after print making has been performed.

As described above, the image database 14 and the image processor 18 perform processing based on the order table. In a like manner, in the case of the remaking, based on the updated order table, the image data is supplied (arrow g), the order data is read (arrow h), and the print image data is generated by processing the image data and is supplied to the printer 20 (arrow i). In addition, in the case of the remaking, the print image data is given information showing that the print image data is for remaking and is supplied to the printer 20.

The printer 20 exposes the photosensitive material A and performs development/drying. Here, remade prints P are not supplied to the packer 34 but are discharged to the large size print discharging part 54.

As described above, the print pack containing the prints judged as NG is not sealed, so it becomes possible for the operator to pack the remade prints in the print pack with ease. Note that it is sufficient that the sealing of the print pack in this case is performed with a manual sealing device or the like.

It should be noted that the present invention is not limited to the form in which when the sealing of the print pack is not needed, the print pack is discharged without being sealed at all. For instance, the print pack, whose sealing is not needed, may be discharged to the unsealed print pack receiving unit 70b under a state in which it has been temporarily sealed only at several spots. With this construction, even when the print pack has not been sealed, it becomes possible to prevent a situation in which the prints flies out of the print pack and are scattered when the film pack 80 is dropped and discharged to the unsealed print pack receiving unit 70b.

That is, in the present invention, a state, in which the print pack (bag containing prints) has not been sealed, refers to a state, in which hermetic sealing for completing the print pack as a product has not been performed, and includes a state in which the print pack has been temporarily sealed only at several spots and it is possible to open the print pack with ease.

It should be noted that in the image forming apparatus described above, whether the sealing of the print pack is needed or not is judged based on results of checking read image data of images reproduced on image prints and original image data of images that should be printed against each other, detecting occurrence of a trouble in the printer, and comparing the number of image prints that should be produced and the number of image prints that have actually been produced against each other, and the order information (which includes the orders for high-quality finishing, urgent finishing, ordinary finishing, print production in multiple sizes, or print production from a film). However, in the present invention, whether the sealing of the print pack is needed or not may be judged only based on at least one of the results of checking read image data of images reproduced on image prints and original image data of images that should be printed against each other, detecting occurrence of a trouble in the printer, and comparing the number of image prints that should be produced against the number of image prints that have actually been produced. Alternatively, whether the sealing is needed or not may be judged only based on the order information described above.

As is apparent from the above description, according to the present invention, in an apparatus that produces prints and automatically packs them in units of orders, even when inappropriate prints have been produced for some reason, even when the number of the prints is inappropriate, or even when appropriate prints have not been produced due to a trouble such as jamming, it becomes possible to detect the inconvenient situation by performing an inspection, error detection, or the like, which makes it possible to prevent a situation in which inappropriate prints or print packs are provided to customers.

Also, even when inappropriate prints have been produced, it becomes possible to remake the prints with ease and without delay using information from the finished-quality check control unit 112 or the like and pack remade prints in print packs.

Further, according to the present invention, in an apparatus that produces prints and automatically packs them in units of orders, whether sealing of each print pack corresponding to an order is needed or not is judged based on the order contents of the order and the print pack is sealed when it has been judged that the sealing is needed. As a result, in the case of an ordinary finishing order or an urgent finishing order, it becomes possible to automatically seal the print pack and produce prints (print pack) with favorable productivity. On the other hand, in the case of an order in which an inspection is required such as a high-quality finishing order, an order for production of prints including prints in sizes in which packing in the print pack (packing sheet S) is difficult or a trouble easily occurs during the packing, or an order for production of prints from a film, the print pack is outputted without being sealed. As a result, it becomes possible to conduct an inspection with ease and perform packing of prints in the print pack with reliability and safety even when the prints have sizes in which the packing in the print pack is possible but automatic packing is impossible or is not stabilized. In addition, packing of a film in the print pack also becomes possible, so it also becomes possible to suitably cope with production of prints from a film that it is difficult for an ordinary apparatus having an automatic packing function to cope with.

In the above description, when prints corresponding to an order have been judged as NG as a result of a check, the prints P are sent to the packer 34 and a print pack is discharged without being sealed at the packer 34. However, the present invention is not limited to this. For instance, a construction, in which when prints corresponding to an order have been judged as NG, the prints are not sent to the packer 34 but are discharged to the large size print discharging part 54, may be used instead. In addition, a construction, in which when NG occurred, only a warning is issued, is also possible.

Also, in the embodiment described above, at the time of remaking, images and order data are acquired from the image database 14 and the order controller 16 and the remaking is performed using print images created by the image processor 18. However, the present invention is not limited to this. For instance, images may be stored in the printer 20 until appropriate prints are produced and remake processing may be performed in the printer 20 without issuing an inquiry to the order controller 16.

The image forming method and apparatus according to the present invention have been described in detail above but the present invention is not limited to the embodiment described above and it is of course possible to make various modifications and changes without departing from the gist of the present invention.

What is claimed is:

1. An image forming method for packing a plurality of image prints in a bag as finished prints corresponding to an order and outputting the bag containing the plurality of image prints, comprising:

an image print producing step of recording each of the plurality of images on a recording medium based on image data which is reproduced corresponding to each of the plurality of images, thereby to produce the image prints on an image-by-image basis;

a step of judging whether the bag needs to be sealed or not when the plurality of image prints thus produced are packed in the bag as the finished prints corresponding to the order; and an image print outputting step of packing the plurality of image prints in the bag as the finished prints corresponding to the order and sealing the bag containing the plurality of image prints based on a result of the judging, thereby to output the plurality of image prints contained in the sealed bag.

2. The image forming method according to claim 1, wherein:

the judging of whether the bag needs to be sealed or not is performed by checking appropriateness of each of the plurality of image prints; and when the judging is made from a checking result that all of the plurality of image prints are appropriate, the plurality of image prints thus judged to be appropriate are packed in the bag as the finished prints corresponding to the order, the bag containing the image prints, and the sealed bag is outputted to a predetermined portion, and when the judging is made from a checking result that any of the plurality of image prints are inappropriate, the plurality of image prints to be the finished prints corresponding to the order, which include inappropriate images, are outputted to a portion other than the predetermined portion without being packed in the bag.

3. The image forming method according to claim 1, wherein:

the judging of whether the bag needs to be sealed or not is performed by checking appropriateness of each of the plurality of image prints; and when the judging is made from a checking result that any of the plurality of image prints are inappropriate, the plurality of image prints are packed in the bag and the bag containing the plurality of image prints is outputted without being sealed, and when the judging is made from a checking result that all of the plurality of image prints are appropriate, the plurality of image prints are packed in the bag, the bag containing the plurality of image prints is sealed, and the sealed bag is outputted.

4. The image forming method according to claim 3, wherein the appropriateness of each of the plurality of image prints is checked based on at least one of a result of comparison between original image data of images to be reproduced on the plurality of image prints and read image data of the images actually reproduced on the plurality of image prints, a result of detection of a malfunction occurring in the image recording, and a result of comparison between a number of a plurality of images to be printed and a number of the image prints actually produced.

5. The image forming method according to claim 1, wherein whether the sealing is needed or not is judged based on order information corresponding to the order.

6. The image forming method according to claim 5, wherein the order information includes at least one of information of image quality, print size, finishing speed from the order to the outputting and an image data source of the plurality of images to be printed.

7. The image forming method according to claim 6, wherein:

the order information includes at least one of information showing that high-quality finishing has been ordered, information showing that urgent finishing has been ordered, information showing that ordinary finishing has been ordered, information showing that print production in multiple sizes has been ordered, and information showing that print production from a film has been ordered; and it is judged that the sealing is not needed when the order information includes at least one of the information showing that the high-quality finishing has been ordered, information showing that production of prints including at least one print that has a size other than a predetermined size has been ordered, and the information showing that the print production from a film has been ordered, and it is judged that the sealing is needed when the order information includes one of the information showing that the urgent finishing has been ordered and the information showing that the ordinary finishing has been ordered.

8. An image forming apparatus for packing a plurality of image prints in a bag as finished prints corresponding to an order and outputting the bag containing the plurality of image prints, comprising:

an image forming part for recording each of the plurality of images on a recording medium based on image data which is reproduced corresponding to each of the plurality of images, thereby to produce the image prints on an image-by-image basis;

a first judging part for judging whether a bag in which the plurality of image prints thus produced are packed as the finished prints corresponding to the order needs to be sealed or not based on a result of checking appropriateness of each of the image prints; and a packer for packing in the bag the plurality of image prints produced as the finished prints corresponding to the order, sealing the bag containing the plurality of image prints based on a result of the judging, and outputting the sealed bag.

9. The image forming apparatus according to claim 8, wherein when the first judging part judges from a checking result that any of the plurality of image prints are inappropriate, the plurality of image prints are outputted to a portion that is different from the packer without being packed in the bag.

10. The image forming apparatus according to claim 8, wherein when the first judging part judges from a checking result that any of the plurality of image prints are inappropriate, the plurality of image prints are packed in the bag by the packer and the bag is outputted without being sealed.

11. The image forming apparatus according to claim 8, wherein when the first judging part judges from a checking result that any of the plurality of image prints are inappropriate, the image forming part remakes each inappropriate image print by recording an image on the recording medium based on image data corresponding to the inappropriate image print.

12. The image forming apparatus according to claim 8, wherein the appropriateness of each of the plurality of image prints is checked based on at least one of a result of comparison between original image data of images to be reproduced on the plurality of image prints and read image data of the images actually reproduced on the plurality of image prints, a result of detection of a malfunction occurring at the image forming part, and a result of comparison between a number of a plurality of images to be printed and a number of the image prints actually produced.

13. The image forming apparatus according to claim 8, further comprising a second judging part for judging whether a bag in which the plurality of image prints thus produced are packed as the finished prints corresponding to the order needs to be sealed or not based on order information corresponding to the order, wherein when the second judging part judges that the bag needs to be sealed, the packer packs the plurality of image prints in the bag, seals the bag containing the plurality of image prints, and outputs the sealed bag.

14. The image forming apparatus according to claim 13, wherein the order information includes at least one of information of image quality, print size, finishing speed from the order to the outputting and an image data source of the plurality of images to be printed.

15. The image forming apparatus according to claim 14, wherein:

the order information includes at least one of information showing that high-quality finishing has been ordered, information showing that urgent finishing has been ordered, information showing that ordinary finishing has been ordered, information showing that print production in multiple sizes has been ordered, and information showing that print production from a film has been ordered; and the second judging part judges that the sealing is not needed when the order information includes at least one of the information showing that the high-quality finishing has been ordered, information showing that production of prints including at least one print that has a size other than a predetermined size has been ordered, and the information showing that the print production from a film has been ordered, and judges that the sealing is needed when the order information includes one of the information showing that the urgent finishing has been ordered and the information showing that the ordinary finishing has been ordered.

16. An image forming apparatus for packing a plurality of image prints in a bag as finished prints corresponding to an order and outputting the bag containing the plurality of image prints, comprising:

an image forming part for recording each of the plurality of images on a recording medium based on the image data which is reproduced corresponding to each of the plurality of images, thereby to produce the image prints on an image-by-image basis;

a second judging part for judging whether a bag in which the plurality of image prints thus produced are packed as the finished prints corresponding to the order needs to be sealed or not based on order information corresponding to the order; and a packer for packing the plurality of image prints in the bag, sealing the bag containing the plurality of image prints, and outputting the sealed bag when the second judging part judges that the sealing is needed, and for packing the plurality of image prints in the bag and outputting the bag containing the plurality of image prints without sealing the bag when the second judging part judges that the sealing is not needed.

17. The image forming apparatus according to claim 15, wherein the order information includes at least one of information of image quality, print size, finishing speed from the order to the outputting and an image data source of the plurality of images to be printed.

18. The image forming apparatus according to claim 17, wherein:

the order information includes at least one of information showing that high-quality finishing has been ordered, information showing that urgent finishing has been ordered, information showing that ordinary finishing has been ordered, information showing that print production in multiple sizes has been ordered, and information showing that print production from a film has been ordered; and the second judging part judges that the sealing is not needed when the order information includes at least one of the information showing that the high-quality finishing has been ordered, information showing that production of prints including at least one print that has a size other than a predetermined size has been ordered, and the information showing that the print production from a film has been ordered, and judges that the sealing is needed when the order information includes one of the information showing that the urgent finishing has been ordered and the information showing that the ordinary finishing has been ordered.

* * * * *